G. H. FULLER.
Manufacture of Jeweler's Findings.

No. 215,217.              Patented May 13, 1879.

WITNESSES.                                INVENTOR.

UNITED STATES PATENT OFFICE.

GEORGE H. FULLER, OF PAWTUCKET, RHODE ISLAND.

IMPROVEMENT IN THE MANUFACTURE OF JEWELERS' FINDINGS.

Specification forming part of Letters Patent No. 215,217, dated May 13, 1879; application filed February 20, 1879.

*To all whom it may concern:*

Be it known that I, GEORGE H. FULLER, of Pawtucket, in the county of Providence and State of Rhode Island, have invented a new and useful Improvement in the Manufacture of Jewelers' Findings, of which the following is a specification.

My said invention relates to an improvement in the manufacture of jewelers' findings; and consists in an improved method for fastening the wire to the base of the ear-drop, pin, and all similar articles.

The old method was to hard-solder the wire directly to the base. This has been found to be imperfect, because the temper is so drawn from the wire during the soldering process that it becomes soft and yielding, and quite unfitted for constant use.

Figure 1:
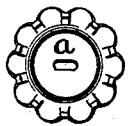
Figure 2:
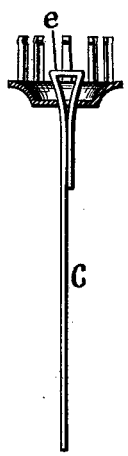
Figure 3:
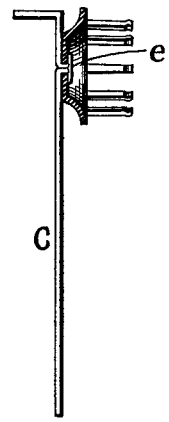

To obviate this difficulty I have devised a new method for uniting the parts, which is substantially as follows: I make a slot through the center of the base, as shown at *a* in Figure 1 of the accompanying drawings. I then double my wire *c*, as shown in Fig. 2 of said drawings, and putting the ends down through the slot in the base, as also shown in said Fig. 2, I spread these ends apart as they project through the slot. Placing the parts in a properly-shaped die, a plunger is brought solidly down upon the wire at its bend. The pressure so spreads and flattens the wire at the bent end *e* that it overlaps the edges of the slot on the upper side of the base. At the same time the projecting ends of the wire on the under side of the base are so separated and bent into the desired shapes that the two branches snugly fill the slot at their point of contact with the base, as seen in Fig. 3 of said drawings. By this method I firmly unite the parts and dispense altogether with the soldering process. The temper of the wire remains intact, and there is a clean and smooth finish of all parts of the connected base and wire.

I claim as my invention and desire to secure by Letters Patent—

The above-described method of securing the wire to the base of jewelers' findings, which consists in providing the base with a slot, passing the wire, bent as shown in Fig. 2, through the slot, spreading the ends apart, and, finally, by means of suitable dies, setting the parts firmly together, all in the manner and for the purposes substantially as shown and described.

GEO. H. FULLER.

Witnesses:
   THOS. P. BARNEFIELD,
   JAMES B. FREEMAN.